United States Patent
Sinton

(10) Patent No.: US 9,335,180 B2
(45) Date of Patent: May 10, 2016

(54) GEOGRAPHIC ROUTE OPTIONS BASED ON DIFFERENT CRITERIA

(75) Inventor: Lee Corey Sinton, Berkshire (GB)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/355,161

(22) PCT Filed: Nov. 2, 2011

(86) PCT No.: PCT/IB2011/054870
§ 371 (c)(1),
(2), (4) Date: Apr. 29, 2014

(87) PCT Pub. No.: WO2013/064861
PCT Pub. Date: May 10, 2013

(65) Prior Publication Data
US 2014/0288831 A1 Sep. 25, 2014

(51) Int. Cl.
*G08G 1/0969* (2006.01)
*G01C 21/34* (2006.01)
*G01C 21/20* (2006.01)

(52) U.S. Cl.
CPC .............. *G01C 21/343* (2013.01); *G01C 21/20* (2013.01)

(58) Field of Classification Search
CPC .. G01C 21/343; G01C 21/20; G01C 21/3492; G01C 21/3682
See application file for complete search history.

(56) References Cited

U.S. PATENT DOCUMENTS

| | | | |
|---|---|---|---|
| 5,568,390 A | 10/1996 | Hirota et al. | |
| 7,490,004 B2 * | 2/2009 | Kimura | 701/426 |
| 2008/0228388 A1 * | 9/2008 | Tauchi et al. | 701/201 |
| 2009/0271105 A1 * | 10/2009 | Kindo et al. | 701/201 |

FOREIGN PATENT DOCUMENTS

| | | | |
|---|---|---|---|
| DE | 102009034508 | | 1/2011 |
| EP | 1926074 | | 5/2008 |
| JP | 11-16094 | * | 1/1999 |
| JP | 11-311530 A | | 11/1999 |
| JP | 2001-174272 | * | 6/2001 |
| JP | 2006-308346 | * | 11/2006 |
| JP | 2007040721 | | 2/2007 |
| JP | 2008-96209 | * | 4/2008 |
| WO | 2011029562 | | 3/2011 |

OTHER PUBLICATIONS

International Search Report received for corresponding Patent Cooperation Treaty Application No. PCT/IB2011/054870, dated Aug. 10, 2012, 5 pages.

Flinsenberg, "Route Planning Algorithms for Car Navigation", Institute for Programming research and Algorithmics, IPA Dissertation Series, Dec. 2004, 276 Pages.

(Continued)

*Primary Examiner* — Michael J Zanelli
(74) *Attorney, Agent, or Firm* — Locke Lord LLP

(57) ABSTRACT

Described herein are one or more examples of an apparatus, the apparatus comprising at least one processor and at least one memory. The memory comprises computer program code stored thereon, the at least one memory and computer program code being configured to, when run on the at least one processor, cause the apparatus to identify one or more geographic route options, for a particular traveler, based on a travel time criteria or travel distance criteria for the traveler. The apparatus is also caused to provide, based on the respective travel time criteria or travel distance criteria, respective range indication signalling for at least one of the identified one or more geographic route options.

18 Claims, 5 Drawing Sheets

(56) References Cited

OTHER PUBLICATIONS

Li et al., "Research on Driver Experience Based Route Planning Method", IEEE Intelligent Vehicles Symposium, Jun. 21-24, 2010, pp. 78-82.

English Language Machine Translation of Japanese Patent Application Publication No. JP11-311530A—35 pages.

Extended European Search Report for European Patent Application No. 11875005.8, Date of Completion of Search: Jun. 9, 2015, 8 pages.

* cited by examiner

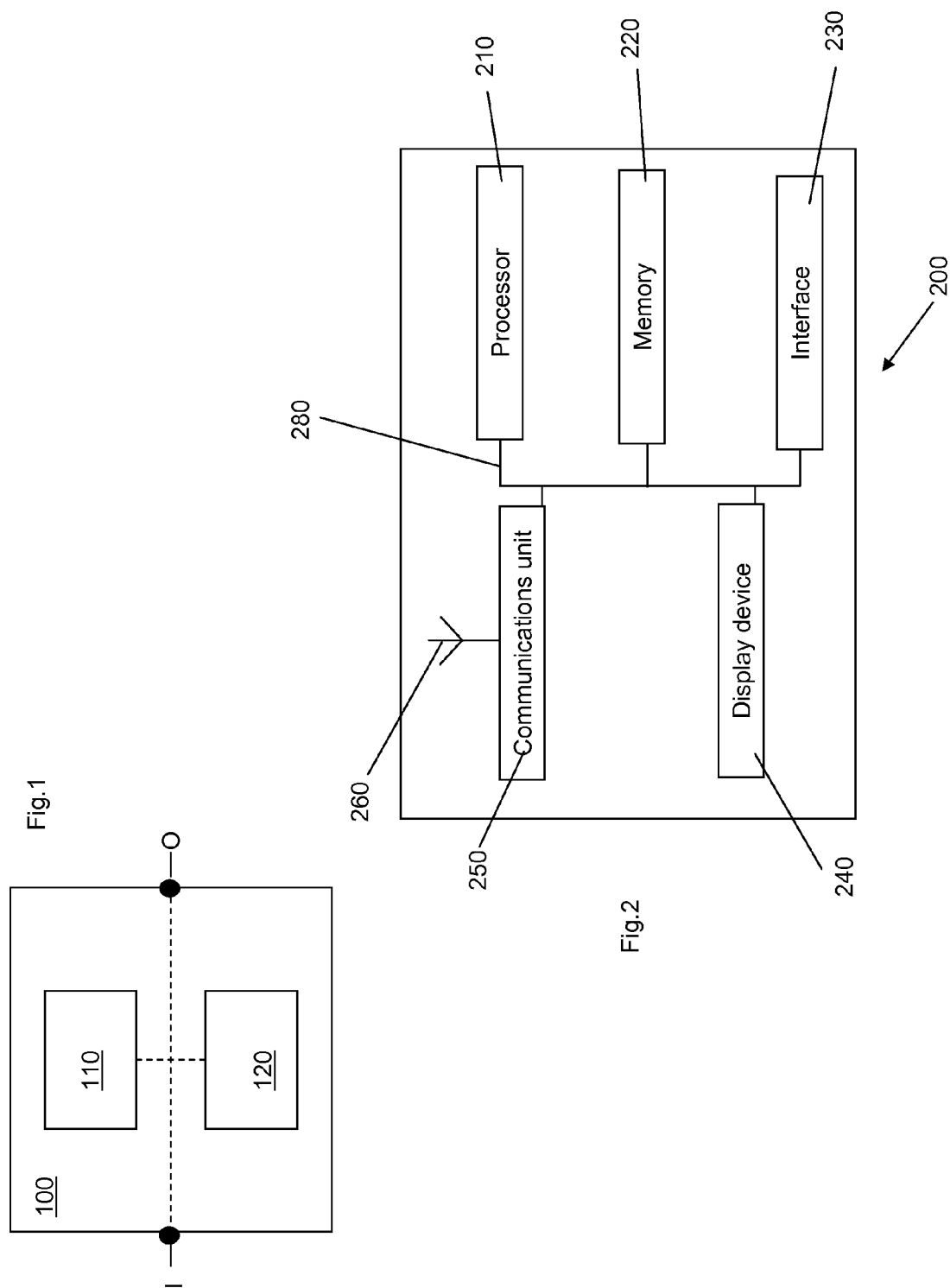

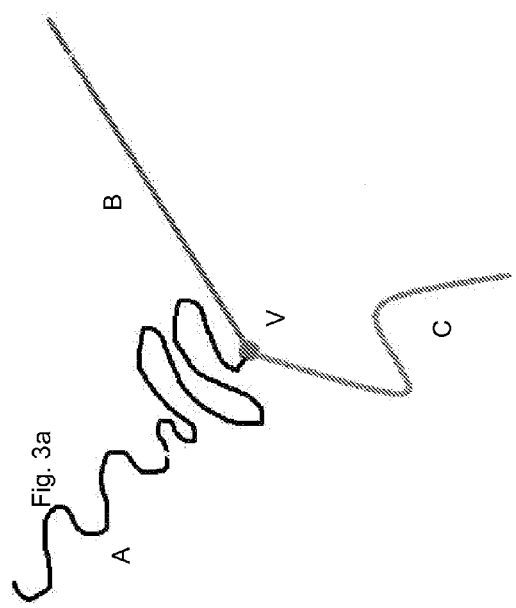
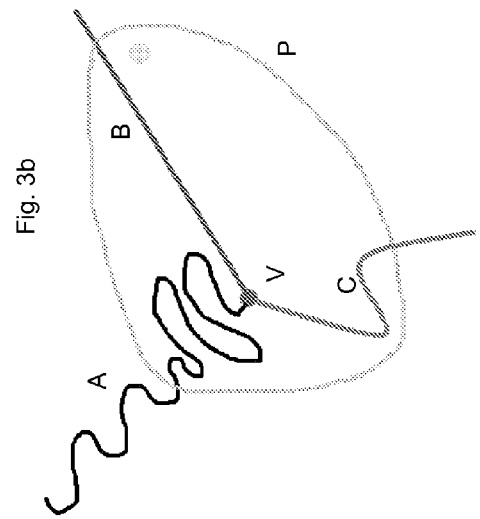
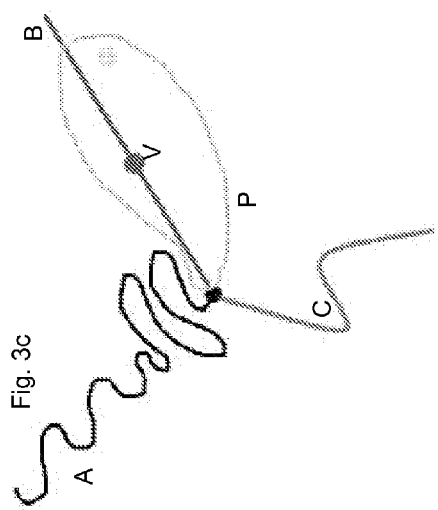
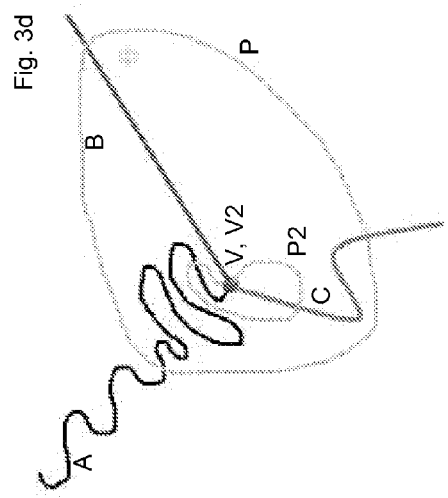

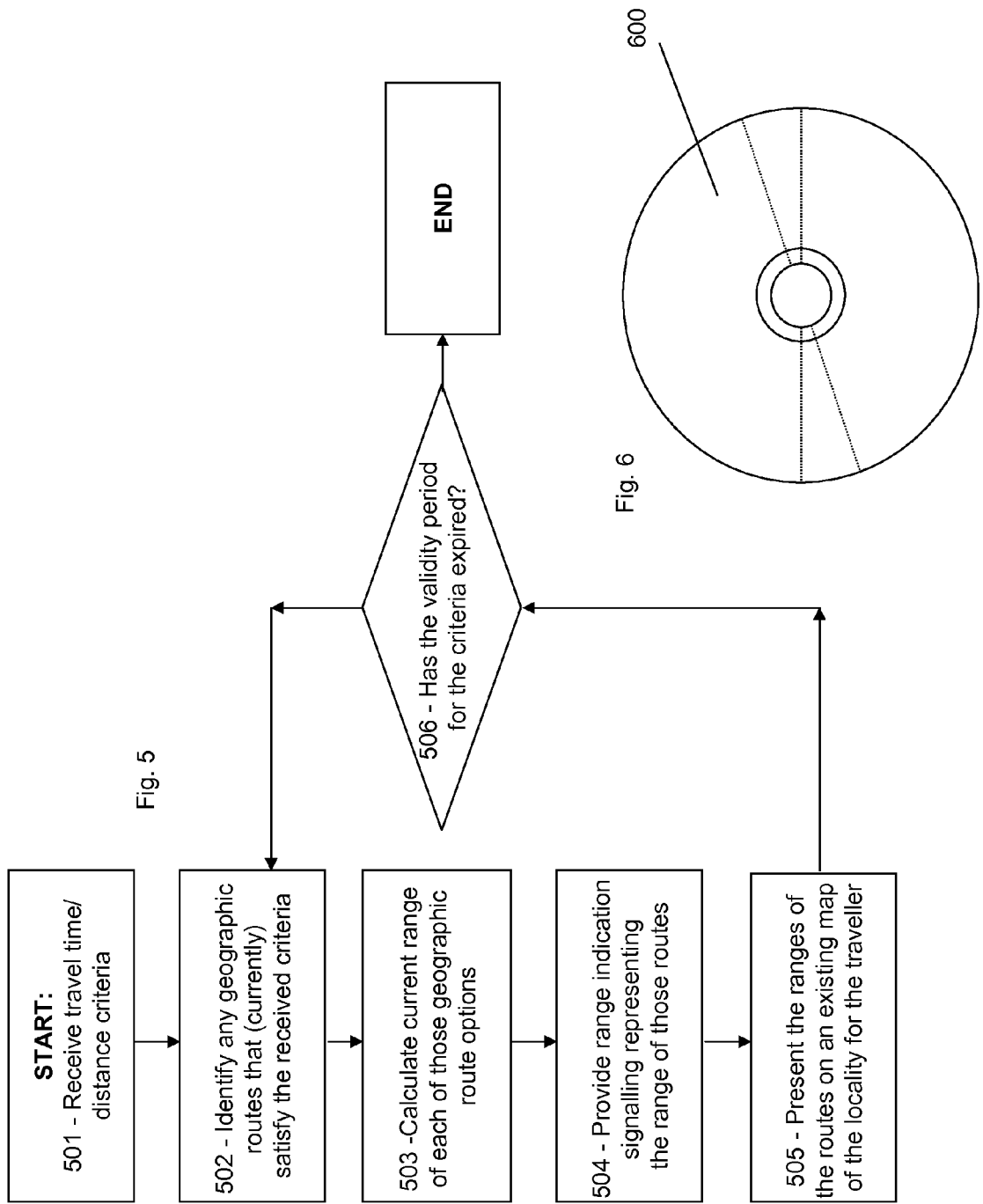

GEOGRAPHIC ROUTE OPTIONS BASED ON DIFFERENT CRITERIA

RELATED APPLICATION

This application was originally filed as PCT Application No. PCT/IB2011/054870 filed Nov. 2, 2011.

TECHNICAL FIELD

The present disclosure relates to the field of geographic route options, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Current GPS or other satellite navigation systems operate on the basis of a user entering a destination, and navigation instructions are provided for that particular traveler to allow them to get to that destination via a particular mode of transport (such as car, bike, plane, boat, etc). Such navigation systems are also useful because they can store information about attractions or locations of interest in a particular area local to a destination. For example, a particular traveler might be travelling from London to Nottingham and wishes to visit a few different sites of interest in Nottingham. The traveler can then use the satellite navigation system to view the different options for visiting.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus comprising:
at least one processor; and
at least one memory, the memory comprising computer program code stored thereon, the at least one memory and computer program code being configured to, when run on the at least one processor, cause the apparatus to:
identify one or more geographic route options, for a particular traveler, based on a travel time criteria or travel distance criteria for the traveler; and
provide, based on the respective travel time criteria or travel distance criteria, respective range indication signalling for at least one of the identified one or more geographic route options.

The respective range indication signalling may dynamically vary for at least one of the identified one or more geographic route options over the validity period for the respective travel time criteria or travel distance criteria.

The validity period may be the period during which there is still travel time or travel distance remaining (associated with the respective aforementioned time/distance criteria) for which the traveler may continue travelling.

The respective range indication signalling may provide a visual indication of the maximum travel range associated with meeting the travel time criteria or travel distance criteria for at least one of the identified one or more geographic route options over the validity period for the respective travel time criteria or travel distance criteria.

The respective range indication signalling may provide a dynamically varying visual indication of the maximum travel range associated with meeting the travel time criteria or travel distance criteria for at least one of the identified one or more geographic route options over the validity period for the respective travel time criteria or travel distance criteria.

The maximum travel range may be provided by a visual range highlight or visual marker along one or more of the geographic route options.

The maximum travel range may be provided by a visual range perimeter associated with a plurality of the geographic route options.

The respective range indication signalling may take into account travel conditions along the respective one or more geographic route options.

Travel conditions may include one or more of:
type of road, road speed, weather, traffic volume, current accidents/collisions, incidents, roadworks, or the like.

The at least one memory and computer program code may be configured to, when run on the at least one processor, cause the apparatus to:
provide an audible indication of the availability of range indication signalling (for example, when the visual representation of the range indication signalling would be out of the current field of view for a particular geographic route option).

The at least one memory and computer program code may be configured to, when run on the at least one processor, cause the apparatus to:
vary the one or more geographic route options during the validity period for the respective travel time criteria or travel distance criteria according to the particular route being adopted by the traveler.

The at least one memory and computer program code may be configured to, when run on the at least one processor, cause the apparatus to:
receive selection input associated with one of the identified route geographic options and provide the respective range indication signalling for the selected geographic route option.

The at least one memory and computer program code may be configured to, when run on the at least one processor, cause the apparatus to:
receive travel time criteria input or travel distance criteria input for the particular traveler.

The identification of one or more geographic route options, for a particular traveler, may comprise one of:
determination of one or more geographic route options by the apparatus; and
receipt of one of the identified geographic route options from another apparatus.

The travel distance criteria may be provided by a management system for a vehicle used by the traveler.

The vehicle may be one of:
pedal-bike, motor-bike, car, bus, tram, airplane, boat, etc.

The travel distance criteria or travel time criteria may be set by a limp-home mode of a management system for a vehicle used by the traveler.

The respective range indication signalling may be calculated/determined by the apparatus or another apparatus.

The at least one memory and computer program code may be configured to, when run on the at least one processor, cause the apparatus to perform at least one of the following:
identify, for display, the one or more geographic route options, for a particular traveler, based on a travel time criteria or travel distance criteria for the traveler; and,
based on the respective travel time criteria or travel distance criteria, provide, for display, respective range indication signalling for at least one of the identified one or more geographic route options.

The apparatus may be comprised by or is one or more of:
a portable electronic device, a module for a portable electronic device, a network server, or module for a network server.

In another aspect, there is provided a method (performable on an apparatus) comprising:
identifying one or more geographic route options, for a particular traveler, based on a travel time criteria or travel distance criteria for the traveler; and
providing, based on the respective travel time criteria or travel distance criteria, respective range indication signalling for at least one of the identified one or more geographic route options.

In another aspect, there is provided a computer readable medium comprising computer program code stored thereon, the at least one memory and computer program code being configured to, when run on at least one processor, perform at least:
identifying one or more geographic route options, for a particular traveler, based on a travel time criteria or travel distance criteria for the traveler; and
providing, based on the respective travel time criteria or travel distance criteria, respective range indication signalling for at least one of the identified one or more geographic route options.

In another aspect, there is provided an apparatus comprising:
means for identifying one or more geographic route options, for a particular traveler, based on a travel time criteria or travel distance criteria for the traveler; and
means for providing, based on the respective travel time criteria or travel distance criteria, respective range indication signalling for at least one of the identified one or more geographic route options.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:—

FIG. 1 illustrates a first example of the present disclosure.

FIG. 2 illustrates a second example of the present disclosure.

FIGS. 3a-3d illustrate the operation of an example of the present disclosure.

FIG. 5 illustrates a method of the present disclosure.

FIG. 6 illustrates schematically a computer readable media providing a program according to an embodiment of the present invention.

Figure 4A:
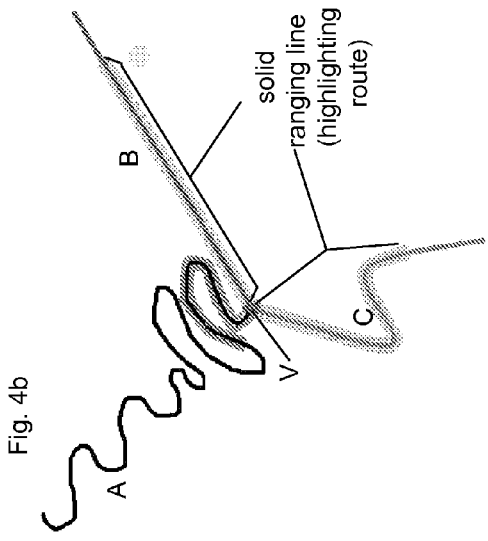
FIGS. 4a-4d illustrate variations of an example of the present disclosure

DESCRIPTION OF EXAMPLE
ASPECTS/EMBODIMENTS

In contrast with some current GPS/satellite navigation systems, for some travelers there may be no particular destination that they have in mind, and it is the act of travelling somewhere that they are looking to enjoy. In which case, current satellite navigation systems may not be able to satisfy such a traveler's needs.

For example, many families who go on holiday to areas they are not familiar with wish to visit the surrounding area for places of interest and have no particular preference exactly where they go to, rather they just do not want to be in the car for more than a certain period of time. This is particularly true of families with kids who are young and do not like travelling too far in the car on any one journey. It would be helpful if their normal satellite navigation device could take this desire into account, and present them with possible geographic routes that match their specified criteria. In the present disclosure, at least one example will be described that provides an apparatus that can allow for a traveler to enter a particular travel time criteria—such as 'I do not want to have to travel for more than one hour'—to identify one or more geographic route options that satisfy the travel time criteria.

In another example, it may be that a traveler's vehicle suffers some kind of malfunction that requires the vehicle to be serviced or repaired. Sensors in the engine or vehicle management systems report these faults to a user. In some unfortunate cases, the malfunction might mean that the vehicle is in such a state that it cannot travel for more than a certain distance, such as a broken seal meaning that the engine will cut out in approximately 5 kilometers (for example). These issues present quite important travel distance criteria that affect how far the vehicle can travel before it cuts out completely. It would be helpful if a satellite navigation device (internal or external, or as a modification to an existing device/devices) could take these issues into account and present the traveler with possible geographic routes to nearby service stations or repair garages within that travel distance that the vehicle can make it to. Also, it may be that a traveler first wants to travel a particular distance (not linked to a vehicle malfunction).

With these issues in mind, there are described herein one or more examples of an apparatus comprising at least one processor and at least one memory. The memory comprises computer program code stored thereon, the at least one memory and computer program code being configured to, when run on the at least one processor, cause the apparatus to identify one or more geographic route options, for a particular traveler, based on a travel time criteria or travel distance criteria for the traveler. The apparatus is also caused to provide, based on the respective travel time criteria or travel distance criteria, respective range indication signalling for at least one of the identified one or more geographic route options.

By providing an apparatus that can identify geographic route options based on such criteria, and providing respective range indication signalling for at least one of such routes, it is possible to provide meaningful and helpful representations of such routes to a user, for example, via an existing (appropriately modified, for example, by new software) or dedicated satellite navigation device. Advantages of such examples will be explained in more detail below.

We will now describe a first example with reference to FIG. 1.

FIG. 1 shows an apparatus 100 comprising a processor 110, memory 120, input I and output O. In this embodiment only one processor and one memory are shown but it will be appreciated that other embodiments may utilise more than one processor and/or more than one memory (e.g. same or different processor/memory types).

In this embodiment the apparatus 100 is an application specific integrated circuit (ASIC) for a portable electronic device 200 (as shown in FIG. 2) with a touch sensitive display 240 (as per FIG. 2). In other embodiments the apparatus 100 can be a module for such a device, or may be the device itself, wherein the processor 110 is a general purpose CPU of the device 200 and the memory 120 is general purpose memory comprised by the device 200.

The input I allows for receipt of signalling to the apparatus 100 from further components, such as components of a portable electronic device 200 (like the touch-sensitive display 240) or the like. The output O allows for onward provision of signalling from within the apparatus 100 to further components. In this embodiment the input I and output O are part of a connection bus that allows for connection of the apparatus 100 to further components.

The processor 110 is a general purpose processor dedicated to executing/processing information received via the input I in accordance with instructions stored in the form of computer program code on the memory 120. The output signalling generated by such operations from the processor 110 is provided onwards to further components via the output O.

The memory 120 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 110, when the program code is run on the processor 110. The internal connections between the memory 120 and the processor 110 can be understood to, in one or more embodiments, provide an active coupling between the processor 110 and the memory 120 to allow the processor 110 to access the computer program code stored on the memory 120.

In this embodiment the input I, output O, processor 110 and memory 120 are all electrically connected to one another internally to allow for electrical communication between the respective components I, O, 110, 120. In this example the components are all located proximate to one another so as to be formed together as an ASIC, in other words, so as to be integrated together as a single chip/circuit that can be installed into an electronic device. In other embodiments one or more or all of the components may be located separately from one another (for example, throughout a portable electronic device like device 200 and/or may provide/support other functionality, i.e. shared to provide different respective functionalities).

In the example of FIG. 2, the functionality offered by each of the components in the example of FIG. 1 is shared between other components and the functions of the device of FIG. 2. The device 200 of FIG. 2 is a dedicated satellite navigation device like those mounted to a windscreen of a car by drivers on long road trips. In other examples (not shown) the device 200 is actually part of a mobile communications device like a mobile telephone, PDA, tablet PC, or laptop, or the like.

Device 200 comprises processor 210, memory 220, interface 230, display 240 (in certain embodiments, the interface 230 and the display 240 may be combined, for example, via a touch sensitive display), communications unit 250, antenna 260 all connected together via communications bus 280. The communications (or data) bus 280 can be seen, in one or more embodiments, to provide an active coupling between the processor 210 and the memory (or storage medium) 220 to allow the processor 210 to access the computer program code stored on the memory 220. The communications unit 250 and antenna 260 co-operate together to receive and/or access positioning data from satellites or other sources to utilise this data for navigation. The memory 220 comprises the computer program code in the same way as the memory 120 of apparatus 100, but also comprises a map and geographic route database (not shown) within which are stored possible geographic routes available for particular vehicles (such as roads for cars, bike paths for bikes and pedestrians, etc). Such databases and their implementation are well known in the art.

The operation of the present embodiment will now be described with reference to FIGS. 3a-3d, and the functionality of the computer program code will be explained.

It should be noted that for both examples of FIGS. 1 and 2 the same functionality is provided by each example. It should be noted that this functionality can be provided as software, hardware, dedicated hardware, shared hardware, or some combination of these. For example, the apparatus 100 of FIG. 1 can be provided as a retrofit hardware module that can be attached to an existing portable electronic device like a telephone with GPS navigation so as to add the functionality of the apparatus 100 to that device. In another example, the functionality of the computer program code can be uploaded to an existing portable electronic device 200 to provide that functionality, or the computer program code could be prestored on such devices so that they are already provided with such functionality prior to sale. FIGS. 3a-3d will be described in relation to the device 200 of FIG. 2, although variations with different devices with apparatus 100 will be recognised from the following description.

FIG. 3a shows an example where a vehicle V is located at the crossroads of three distinct roads, A, B and C. The vehicle has a particular traveler and his family sat inside. The traveler sets a particular travel time criteria of 1 hour via the interface 230 of the device 200.

The processor 210 recognises that this sets a travel time criteria of 1 hour and that it should locate possible routes that can be taken by the traveler that satisfy this criteria during the validity period of that criteria. The validity period can be understood to be the window of time within which the criteria is still applicable and not yet fully expired/elapsed. Once the time for the particular criteria has elapsed the validity period can be said to have 'expired'. The validity period may be understood to encompass the period during which there is still travel time or travel distance remaining for which the traveler may continue travelling. It should be appreciated that the received criteria can be inputted by a user using the interface 230 as discussed above, but may also be received from another source (e.g. circuitry in a vehicle, external source, network instructions, etc).

Based on the received criteria, the processor 210 would consult/refer to the geographic route database on the memory 220 and look up possible geographic route options that satisfy the travel time criteria. The travel time criteria represent a 'validity period' in which the travel time criteria is still elapsing. It could be that once the travel time criteria is entered (or perhaps selected from a list of options), the travel time starts to countdown/elapse, irrespective of whether movement is occurring. We will now explain how the routes are identified.

The duration for travelling along a particular route is not usually the same for any given traveler for any given distance. The travel time for a particular route is dependent on a number of factors, not just distance. For example, some roads will have faster speed limits than others, which will allow travelers on the faster road to cover a greater distance in the validity period of the travel time than travelers on the slower road would be able to cover. Say, a traveler on a motorway which has a speed limit of 70 miles per hour (mph) can cover 70 miles in an hour, while a traveler in a suburban area which has a speed limit of 30 mph may only be to cover 30 miles in an hour.

It will also be appreciated that different types of road will have different manoeuvrability factors, such as a motorway is relatively straight driving and so the maximum allowable speed can be maintained more or less continuously over that hour. In contrast, a suburban area will have lots of relatively short roads with many junctions, roundabouts, traffic lights, possible roadworks, etc, and all these will cause delays and prevent the maintenance of the maximum travel speed during that time. This will in turn reduce the ability of a given traveler to cover a particular distance in the validity period of the travel time criteria. Similarly, winding roads will require lots of slowing down and speeding up, thereby reducing average travel speed when compared with straight roads that do not require slowing down or speeding up.

Further factors, such as road surface, weather, vehicle type, amount of fuel, accidents, roadworks, detours, and other such factors will play into the actual distance that can be covered by the vehicle and therefore affect the range of a given geographic route option that satisfies the travel time criteria.

The device 200, where possible, will take these factors into account (in this example, at least road speed, though in other examples not necessarily) and will identify possible geographic routes that can be taken from the location of the traveler. The device 200 will then calculate the range of those routes. We will now discuss each of roads A, B and C.

Looking at road A, this road is a winding mountainous route along which has lots of twists and turns that will result in the traveler turning back on themselves a lot. As a result, the 'as-the-crow-flies' distance that can be covered in an hour is going to be relatively little when compared with a straight road (such as road B). The range that can be covered by the traveler in the validity period of the travel time criteria will therefore be relatively short.

Looking at road B, this road is relatively straight motorway which would allow a relatively constant maximum speed should be able to be maintained, and a greater range will be achievable by the traveler in the validity period when compared with road B Looking at road C, this road is a narrow country road which is only a little winding, but the nature of the road will restrict the travel speed. As a result the range of the geographic route in that direction will be greater than the range of the route along road A, but shorter than the range of the route along road B.

The ranges of the respective geographic route options are then provided as range indication signalling by the device 200. This can be presented as an overlay on the presented map shown in FIG. 3b. In this example, the range of the respective routes (as represented by the range indication signalling) is displayed as a perimeter P or 'ranging' circle that joins up the furthest edges of the respective route ranges. The perimeter P is not actually a perfect circle in this instance because the ranges for the different routes are not the same magnitude.

The device 200 would also provide the traveler with landmarks, destinations or locations of interest within range of the respective routes identified based on the particular travel time criteria. The traveler can then select one of these via an input on the interface 230 of the device 200 and directions can then be provided in addition to the ranging information. Assuming that the traveler and his family decide to select a destination along the straighter motorway road B and travel along the route in that direction, the validity period will elapse as they travel. FIG. 3c shows their position 30 minutes into the journey with 30 minutes remaining.

During the travel, the device 200 keeps identifying the geographic route options and providing the appropriate range indication signalling that represents the range of those routes. Now, as the time elapses, the range that can be covered in the remaining time is going to decrease. As a result, the perimeter P that is provided graphically on the map is going to change to represent this. It will be appreciated that this means that road A is no longer available as a geographic route option because it is not possible to return along road B to access road A in the remaining time of the validity period. This example therefore can be understood to vary the geographic route options during the validity period for the particular criteria according to the particular route being adopted by the traveler.

As is shown in FIG. 3c, the perimeter P has shrunk to more closely encapsulate the vehicle. Because the vehicle V has traveled for 30 minutes, it means that if the vehicle was to change direction and go back towards its initial starting point then it should arrive back at its starting point at the 1 hour mark. As a result, the perimeter P actually lines up with the initial starting point at this stage. This is, of course, an idealised situation, and in reality variations in speed, accidents, differences in traffic flow etc, will affect the possibility of this.

As the validity period continues to elapse, the ranges of the route options will decrease until eventually the validity period ends, at which time the range of each route option has disappeared. The perimeter P will therefore shrink and shrink in accordance with elapsing of the validity period to reflect the changes in the available range(s).

FIG. 3d shows an example of device 200 where it is useable with vehicle V which is a car, and also useable with a vehicle V2 which is a bicycle. The bicycle has a more limited speed, and therefore can cover less ground and less range of a route in a given period than a car can. As such, the perimeter P2 illustrated is smaller and tighter to the vehicle itself due to the reduced possible range of the vehicle V2 in the validity period of the travel time criteria. Other vehicles can also utilise one or more of these examples, such as pedal-bikes, motor-bikes, cars, vans, buses, trams, airplane, boats, etc.

The respective range indication signalling will therefore dynamically vary for (at least one of the) identified geographic route options over the validity period for the criteria. This ranging circle or perimeter shows that the respective range indication signalling can provide a visual indication of the maximum travel range associated with meeting the particular criteria for at least one of the identified one or more geographic route options over the validity period for the particular criteria.

Overall, the respective range indication signalling can be useable to provide a dynamically varying visual indication of the maximum travel range associated with meeting the criteria over the corresponding validity period (e.g. via the visual range perimeter associated with a plurality of the geographic route options as shown in FIGS. 3a-3d, or a visual range highlight or visual marker along one or more of the geographic route options as shown in FIGS. 4a-4d).

As well as (or alternatively to) the visual indication, the apparatus 100 or device 200 can use the range indication signalling to provide an audible indication of the availability of range indication signalling (for example, when the visual representation of the range indication signalling would be out of the current field of view for a particular geographic route option, or the like).

The scenario shown in FIGS. 3a-3d can also be applied to another example where the vehicle suffers a malfunction which requires the traveler to get the vehicle to a service station. The nature of the malfunction generates a signal that can be interpreted by the processor 210 of the device 200 and translated into a travel distance criteria that can be covered by the vehicle V before it is no longer able to travel at all. This can constitute travel distance criteria being received by the apparatus 100/device 200. This functionality can be provided/implemented by a management system for a vehicle used by the traveler (or be input by the traveler, e.g. travel distance is 5 km).

One or more examples described above can also be configured to tie into or communicate with a vehicle's on-board computer systems and engine management system. Cars that provide indications to the user of when the car is in need of a service or if a fault is detected by the on-board computer and tells the user to either stop completely and to travel no further or to drive the car to the nearest service centre or garage could make good use of such a feature. In this case the point of interest could be garages or service centres or these points of interest added to the already defined and selected list of points of interest. Based on the needs of the car and the level of the fault and knowledge of how far and how fast and for how long the car can be driven without causing any damage could be used as input into the invention and highlight the nearest service centre and automatically navigate the driver to that destination.

Likewise, if fuel becomes low and the fuel warning light is activated then given the known range available from the on-board computer system (e.g. a car or other vehicle's user interface, such as provided by using a Controller Area Network (CAN) and/or Media Oriented Systems Transport (MOST) bus (which utilises an optical interface)), the time of day, road currently being traveled on and of course the current location then the system will automatically highlight all of the petrol stations within range. The system could automatically select the closest petrol station to navigate to but the user could select another within the ranging data if so desired. The fuel condition alone could be taken into account without also considering the other factors (e.g. time of day, etc) to determine the range.

The data link between the navigation device and the car's on-board computer could be wireless via Bluetooth, Bluetooth low energy or via a galvanic connection such as a standard communication bus commonly used in vehicles or even interfaces such as USB or other serial based connections. For built-in navigation systems then it makes sense to connect directly via the car's main control bus such as the standard communication bus. However, for mobile navigation devices, the interface would be best suited to a wireless connection. A suitable command and protocol would be defined to allow the relevant information to be shared between the on-board computer and the navigation device.

This can allow a traveler with a malfunctioning vehicle to identify a particular service station within reach of the vehicle given its travel distance criteria, select that as a destination within range of the travel distance criteria and 'limp' the vehicle to that destination. The travel distance criteria or travel time criteria may therefore be provided as part of a limp-home' mode of a management system for a vehicle used by the traveler. For example, the limp-home mode might operate on the premise that the engine can continue to operate at a maximum speed of 40 miles per hour and/or with maximum of 2500 revolutions per minute for a period of 45 minutes to thereby allow for calculation of a maximum travel distance criteria.

In the same way as described for the travel time criteria, various issues can be taken into account when identifying which geographic route options are available, and the range indication signalling representing the range associated with those possible routes can be provided and presented on the display 240 of the device 200. In general, the particular criteria (whether time-based or distance-based) can be taken into account to allow a user to review possible destinations that they can travel to, select one of those destinations, and keep receiving an update of their continued travelling until the validity period expires.

In the examples above, the range indication signalling is provided then presented as a perimeter circle or ranging area on the display 240. FIGS. 4a-4d show alternative ways to present this information.

Figure 4B:
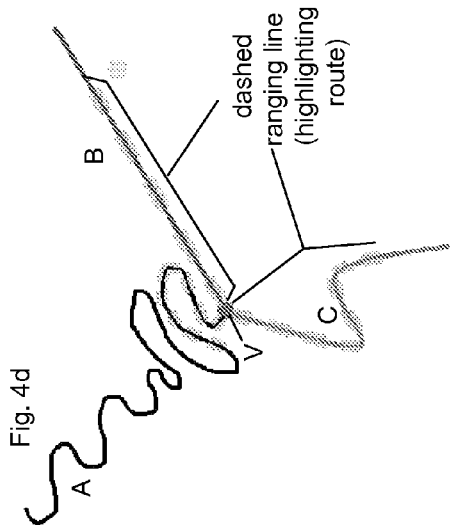

FIGS. 4a and 4b utilise route lines that extend along available geographic route options, where the route line of FIG. 4a is the same width as the route but stops at the end of the possible range, while the route of FIG. 4b is the same but emboldened and thicker than the width of the displayed route.

Figure 4C:
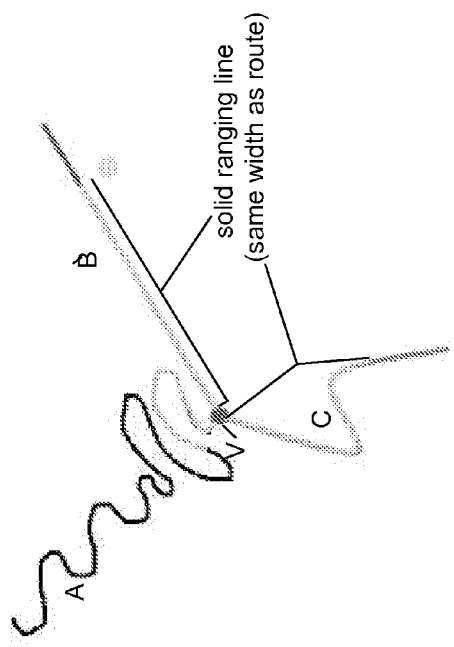
Figure 4D:
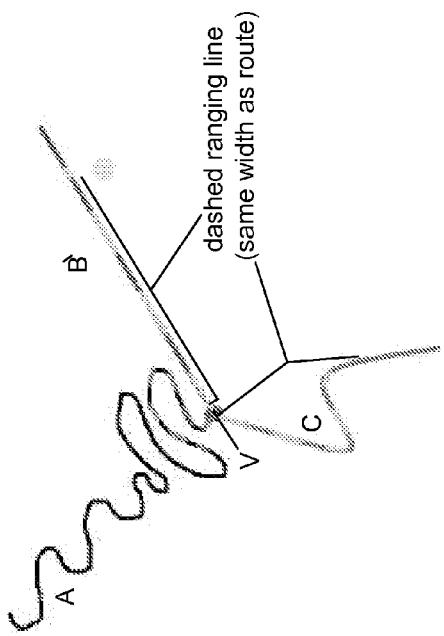

FIGS. 4c and 4d are respectively similar to FIGS. 4a and 4b but utilise dashed route lines instead of solid route lines. It will be appreciated that these illustrates different types of visual representation for the ranges, and that other types of highlighting or visual indications are within the scope of the present disclosure.

By identifying such geographic route options and providing range indication signalling representing the ranges of those routes, it is possible to present to a user/traveler dynamic ranging lines that permit an overview of the distance they could travel in any direction based on their current location, mode of transport, type of road, etc being traveled on and also the time of day. This can be further expanded to any type of transport method. For example, if travelling by aircraft then the ranging lines would basically be a pure circle about the user's current position. As the user travel then the ranging circle (or rather, ranging 'shape' or perimeter) reduces slowly so that it is always showing where the user could travel to in the allocated time. This is particularly relevant in situations where fuel might be running low.

As will be understood from the above discussion, one or more routes may be provided but one or more other routes may not necessarily be provided to a user (for example, based on consideration of routes that the user has already traveled along in the current journey or previously taken journeys so as to prevent a traveler repeating certain routes, or the like). In addition, as the validity period for particular criteria elapses the ranges will alter and the representation of the collective respective ranges will change. For example, the perimeter or ranging circle in FIGS. 3a-3d will change shape as the ranges decrease or alter. In any case, after the validity period expires the ranges and any presentation thereof would have diminished to nothing.

This dynamic range representation can be useful in different circumstances. For example, if say at 30 minutes into a journey with a travel time criteria of 60 minutes it is decided to go somewhere else but the absolute journey time is to remain the same. Another point of interest could be selected within the current range circle.

As has been discussed, the ranges of the respective routes are always decreasing based on time elapsed so if a traveler chose to sit in the car and not move for the duration of the travel time then the range circle will deplete to nothing. Likewise, traffic hold ups will cause this to happen and hence effectively extend the travel time or reduce the distance you were able to travel to in that period. Live traffic updates (e.g. such as those used in TomTom™ or Google™ maps) could also feed the system and would dynamically be used to update the ranging circles/indications. If heavy traffic was detected on the route to your destination then clearly you will be unable to travel at the desired speed and hence will cause the range circle to decrease in range appropriately. If unable to reach your initial destination in the allotted time period then the delta could be represented by a red area (range circle) based on your current position and your original intended destination or by highlighting the route in red to indicate by how much you would fall short by.

Other examples (not shown) can provide options for different modes of transport such as walking, cycling etc, or even to provide for these simultaneously if travelers wish to establish possible routes under different modes of transport. These could be provided in different transparent/translucent/opaque colours over a provided map.

Figure 7:
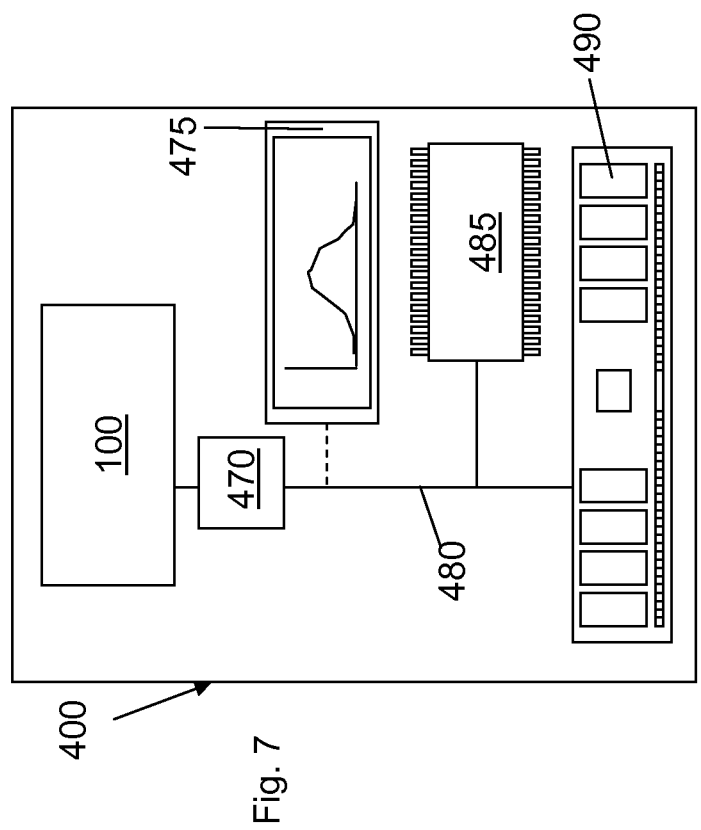
FIG. 7 illustrates another example.

FIG. 2 illustrated schematically a device 200 (such as a portable mobile telephone or portable electronic device) comprising the apparatus 100 as per any of the embodiments described above, and FIG. 7 illustrates a further implementation in device 400.

The device 400 may be an electronic device (including a tablet personal computer), a portable electronic device, a portable telecommunications device, or a module for any of the aforementioned devices. The apparatus 100 can be provided as a module for such a device 400, or even as a processor/memory for the device 400 or a processor/memory for a module for such a device 400. The device 400 also comprises a processor 485 and a storage medium 490, which are electrically connected to one another by a data bus 480. This data bus 480 can be seen to provide an active coupling between the processor 485 and the storage medium 490 to allow the processor 480 to access the computer program code.

The apparatus 100 is first electrically connected to an input/output interface 470 that receives the output from the apparatus 100 and transmits this onwards to the rest of the device 400 via data bus 480. Interface 470 can be connected via the data bus 480 to a display 475 (touch-sensitive or otherwise) that provides information from the apparatus 100 to a user. Display 475 can be part of the device 400 or can be separate.

The device 400 also comprises a processor 485 that is configured for general control of the apparatus 100 as well as the rest of the device 400 by providing signalling to, and receiving signalling from, the other device components to manage their operation.

The storage medium 490 is configured to store computer code configured to perform, control or enable the making and/or operation of the apparatus 100. The storage medium 490 may also be configured to store settings for the other device components. The processor 485 may access the storage medium 490 to retrieve the component settings in order to manage the operation of the other device components. The storage medium 490 may be a temporary storage medium such as a volatile random access memory. On the other hand, the storage medium 490 may be a permanent storage medium such as a hard disk drive, a flash memory, or a non-volatile random access memory. The storage medium 490 could be composed of different memory types.

FIG. 5 illustrates a method according to one or more of the examples described above.

501—Receive travel time/distance criteria—this might be from a user via an interface (such as interface 230/240 of device 200) or from another source (e.g. external wireless source, or from engine sensors, or the like).

502—Identify any geographic routes that (currently) satisfy the received criteria—This step performs a look-up of any geographic routes that will fall within the parameters set by the received criteria. This might be performed via the apparatus 100 or device 200 determining one or more geographic route options, or these routes may determined by another separate apparatus/device/server and this step merely involves receiving/retrieving the routes identified by that other component.

503—Calculate current range of each of those geographic route options—Once the routes have been identified then the ranges of those respective routes that will be achievable in the validity period of the received criteria (e.g. based on the various factors that can be taken into account). In this example the apparatus 100 or device 200 performs the calculations, but in other examples (not shown) some other component may perform the processing (e.g. processor of the vehicle in which the apparatus 100/device 200 is used, or a remote/network server, or the like).

504—Provide range indication signalling representing the range of those routes—The range indication signalling is electrical signalling that provides data representing the ranges of the respective routes. This can allow for later (or current) presentation of the ranges of the routes on various devices, whether the same or different to whichever device/apparatus is performing this method. Again, this step could be performed by a separate component or apparatus/device.

505—Present the ranges of the routes on an existing map of the locality for the traveler—This step uses the range indication signalling to present the ranges of the routes as an overlay or insertion into an existing navigational aid or map.

506—Has the validity period for the criteria expired? —If the validity period for the criteria is no longer active or has fully elapsed, then the method ends because there is no longer any reason to provide signalling. Otherwise the method returns to step 502 to repeat and cause updating of the range indication signalling. In other examples (not shown) the ranging simply stops when the validity period expires but the provision of navigation information may still be provided.

In certain embodiments, different steps can be combined (for example, steps 502 and 503 can be combined in certain examples).

FIG. 6 illustrates schematically a computer/processor readable media 500 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function. The computer program code may be distributed between the multiple memories of the same type, or multiple memories of a different type, such as ROM, RAM, Flash, hard disk, solid state, etc.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more electrical/optical signals transmitted as a series of transmitted and/or received signals. The series of signals may comprise one, two, three, four or even more individual signal components or distinct signals to make up said signalling. Some or all of these individual signals may be transmitted/received simultaneously via wired or wireless connections, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
at least one processor; and
at least one memory, the memory comprising computer program code stored thereon, the at least one memory and computer program code being configured to, when run on the at least one processor, cause the apparatus to:
identify one or more geographic route options, for a particular traveller, based on a travel time criteria or travel distance criteria for the traveler, wherein identifying a route is further based on route maneuverability factors including whether a route includes a straight road and whether a route includes a winding road; and
provide, based on the respective travel time criteria or travel distance criteria, respective range indication signal for at least one of the identified one or more geographic route options following a user selection of time or distance criteria,
wherein the respective range indication signal provides a visual indication of a maximum travel range associated with meeting the travel time criteria or travel distance criteria for at least one of the identified one or more geographic route options over a validity period for the respective travel time criteria or travel distance criteria.

2. The apparatus of claim 1, wherein the respective range indication signal dynamically varies for at least one of the identified one or more geographic route options over a validity period for the respective travel time criteria or travel distance criteria.

3. The apparatus of claim 1, wherein the respective range indication signal provides a dynamically varying visual indication of a maximum travel range associated with meeting the travel time criteria or travel distance criteria for at least one of the identified one or more geographic route options over a validity period for the respective travel time criteria or travel distance criteria.

4. The apparatus of claim 1, wherein the maximum travel range is provided by a visual range highlight or visual marker along one or more of the geographic route options.

5. The apparatus of claim 1, wherein the maximum travel range is provided by a visual range perimeter associated with a plurality of the geographic route options.

6. The apparatus of claim 1, wherein respective range indication signal is based at least in part on travel conditions along the respective one or more geographic route options.

7. The apparatus of claim 1, wherein the at least one memory and computer program code are configured to, when run on the at least one processor, cause the apparatus to:
provide, on a display, a visual indication of a range indication signal for an identified geographic route option; and
provide an audible indication of an availability of a range indication signal when a visual representation of a range indication signal for an identified geographic route option would be out of a current field of view displayed on the display.

8. The apparatus of claim 1, wherein the at least one memory and computer program code are configured to, when run on the at least one processor, cause the apparatus to:
vary the one or more geographic route options during a validity period for the respective travel time criteria or travel distance criteria according to the particular route being adopted by the traveller following a user selection of time or distance criteria.

9. The apparatus of claim 1, wherein the at least one memory and computer program code are configured to, when run on the at least one processor, cause the apparatus to:
receive selection input associated with one of the identified route geographic options and provide the respective range indication signalling for the selected geographic route option.

10. The apparatus of claim 1, wherein the at least one memory and computer program code are configured to, when run on the at least one processor, cause the apparatus to:
receive travel time criteria input or travel distance criteria input for the particular traveler.

11. The apparatus of claim 1, wherein the identification of one or more geographic route options, for a particular traveller, comprises one of determination of one or more geographic route options by the apparatus and receipt of one of the identified geographic route options from another apparatus.

12. The apparatus of claim 1, wherein the travel distance criteria is provided by a management system for a vehicle used by the traveller.

13. The apparatus of claim 1, wherein the respective range indication signal is determined by the apparatus or another apparatus.

14. The apparatus of claim 1, wherein the at least one memory and computer program code are configured to, when run on the at least one processor, cause the apparatus to perform at least one of the following:
identify, for display, the one or more geographic route options, for a particular traveller, based on a travel time criteria or travel distance criteria for the traveller; and,
based on the respective travel time criteria or travel distance criteria, provide, for display, respective range indication signal for at least one of the identified one or more geographic route options.

15. A method comprising:
identifying one or more geographic route options, for a particular traveller, based on a travel time criteria or travel distance criteria for the traveller, wherein identifying a route is further based on route maneuverability factors including whether a route includes a straight road and whether a route includes a winding road; and
providing, based on the respective travel time criteria or travel distance criteria, respective range indication signalling for at least one of the identified one or more geographic route options following a user selection of time or distance criteria,
wherein the respective range indication signalling provides a visual indication of a maximum travel range associated with meeting the travel time criteria or travel distance criteria for at least one of the identified one or more geographic route options over a validity period for the respective travel time criteria or travel distance criteria.

16. The method of claim 15, further comprising dynamically varying the respective range indication signal for at least one of the identified one or more geographic route options over a validity period for the respective travel time criteria or travel distance criteria.

17. The method of claim 15, wherein the travel distance criteria is provided by a management system for a vehicle used by the traveller.

18. A computer program product comprising a non-transitory computer readable storage medium having computer program code stored thereon, which when run on at least one processor, causes an apparatus to perform at least the following:
identifying one or more geographic route options, for a particular traveller, based on a travel time criteria or travel distance criteria for the traveller, wherein identifying a route is further based on route maneuverability factors including whether a route includes a straight road and whether a route includes a winding road; and
providing, based on the respective travel time criteria or travel distance criteria, respective range indication signalling for at least one of the identified one or more geographic route options following a user selection of time or distance criteria,
wherein the respective range indication signalling provides a visual indication of a maximum travel range associated with meeting the travel time criteria or travel distance criteria for at least one of the identified one or more geographic route options over a validity period for the respective travel time criteria or travel distance criteria.

* * * * *